(12) United States Patent
Arimori et al.

(10) Patent No.: US 12,192,425 B2
(45) Date of Patent: Jan. 7, 2025

(54) IMAGE READING DEVICE HAVING MEASURING SECTION WITH ENCODER

(71) Applicant: SEIKO EPSON CORPORATION, Tokyo (JP)

(72) Inventors: Kazuhiko Arimori, Kitakyushu (JP); Makoto Wada, Kitakyushu (JP); Masaya Yamasaki, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 18/502,328

(22) Filed: Nov. 6, 2023

(65) Prior Publication Data
US 2024/0155065 A1  May 9, 2024

(30) Foreign Application Priority Data

Nov. 7, 2022 (JP) .................................. 2022-178108

(51) Int. Cl.
H04N 1/053 (2006.01)
H04N 1/00 (2006.01)
H04N 1/387 (2006.01)

(52) U.S. Cl.
CPC ......... *H04N 1/053* (2013.01); *H04N 1/00657* (2013.01); *H04N 1/3872* (2013.01)

(58) Field of Classification Search
None
See application file for complete search history.

(56) References Cited

U.S. PATENT DOCUMENTS

| 2018/0207961 A1* | 7/2018 | Mori | B41J 13/0009 |
| 2020/0299086 A1* | 9/2020 | Arai | B65H 7/20 |

FOREIGN PATENT DOCUMENTS

JP  2020-152544 A  9/2020

* cited by examiner

*Primary Examiner* — Andrew H Lam
(74) *Attorney, Agent, or Firm* — WORKMAN NYDEGGER

(57) ABSTRACT

An image reading device includes a motor 3, a reading section 7 that reads an image on a medium 5, a first transporting roller 9 that transports the medium in a transport direction F by driving force of the motor and that is provided upstream of the reading section in the transport direction, a second transporting roller 11 that transports the medium in the transport direction by driving force of the motor and that is provided downstream of the reading section in the transport direction, and a measuring section 17, using an encoder sensor 15, configured to measure the rotational position of an encoder scale 13, wherein the encoder scale 13 is provided on a rotation shaft 19 of the second transporting roller 11.

19 Claims, 11 Drawing Sheets

| SHEET POSITION | CONDITION | ADF TRANSPORTING FORCE | DIFFERENCE | THRESHOLD VALUE |
|---|---|---|---|---|
| ALD | 1. NO PAPER | 100 | | |
| | 2. THIN PAPER | 120 | | |
| | 3. THICK PAPER | 140 | | |
| ADF | 4. NO PAPER | 200 | 100 | |
| | 5. THIN PAPER | 220 | 100 | 100+α |
| | 6. THICK PAPER | 240 | 100 | 100+α |

IMAGE READING DEVICE HAVING MEASURING SECTION WITH ENCODER

The present application is based on, and claims priority from JP Application Serial Number 2022-178108, filed Nov. 7, 2022, the disclosure of which is hereby incorporated by reference herein in its entirety.

BACKGROUND

1. Technical Field

The present disclosure relates to an image reading device, an image correction method for the image reading device, and a stopping method of medium transportation for the image reading device.

2. Related Art

An example of this type of device is described in JP-A-2020-152544.

JP-A-2020-152544 discloses that a reading section for reading an image on a medium such as a sheet to be transported is provided, a medium transporting roller is arranged upstream of the reading section, a medium discharge roller is arranged downstream of the reading section, and an encoder scale is installed on the medium transporting roller to measure movement amount of the medium.

In a structure in which the encoder scale is installed on the medium transport roller positioned upstream of the reading section, the movement amount of the medium may be disturbed due to an instantaneous state change when the rear end of the medium separates from the medium transporting roller and the transport state changes to transport using only the medium discharge roller, and the image quality may deteriorate due to the disturbance of the movement amount. However, this point is not considered in JP-A-2020-152544. Therefore, the image quality may be degraded.

SUMMARY

In order to solve the above-described problem, an image reading device according to the present disclosure includes a motor, a reading section that reads an image on a medium, a first transporting roller that transports the medium in a transport direction by a driving force of the motor and is provided upstream of the reading section in the transport direction, a second transporting roller that transports the medium in the transport direction by a driving force of the motor and is provided downstream of the reading section in the transport direction, and a measuring section configured to measure the rotational position of an encoder scale by an encoder sensor, wherein the encoder scale is provided on a rotation shaft of the second transporting roller.

According to present disclosure, an image correction method of an image reading device having a motor, a reading section configured to read an image on a medium, a first transporting roller that transports the medium in a transport direction by a driving force of the motor and is provided upstream of the reading section in the transport direction, a second transporting roller that transports the medium in the transport direction by a driving force of the motor and is provided downstream of the reading section in the transport direction, and a measuring section that measures a rotation position of an encoder scale with an encoder sensor, the encoder scale mounted on a rotation shaft of the second transporting roller. The image reading device has a medium detection section provided upstream of the reading section and a control section, in the image correction method of the image reading device, the control section performs measuring a current distance after the medium passes through the medium detection section by the measuring section, calculating a differential distance between the current distance and a target distance stored in advance, specifying a position where a difference distance exists in the image data read by the reading section, and executing an image correction on the specified position by the control section.

DESCRIPTION OF EMBODIMENTS

Figure 1:
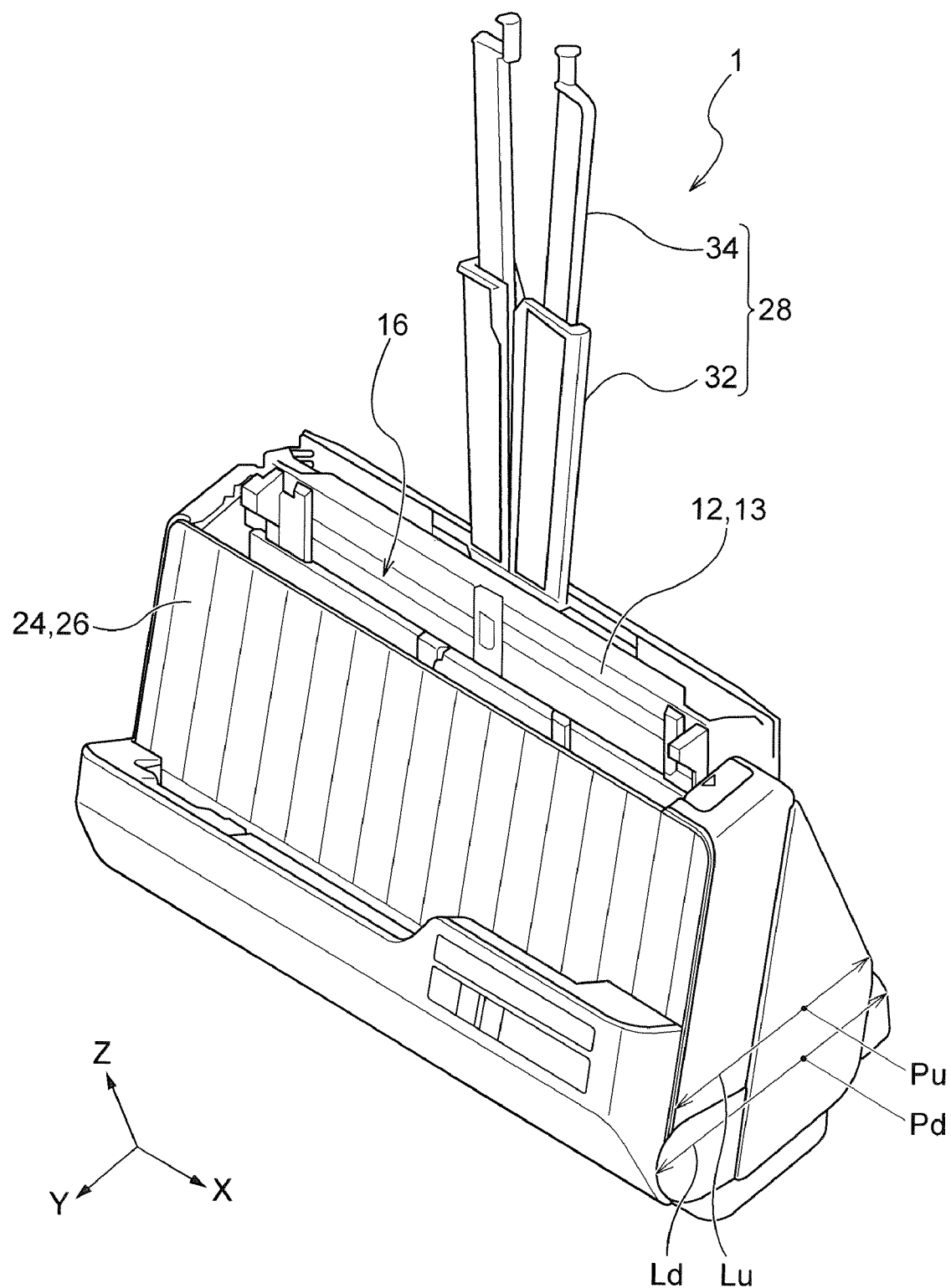
FIG. 1 is a perspective view showing the appearance of the image reading device according to the first embodiment.

The present disclosure will be described briefly.

In order to solve the above-described problem, an image reading device, according to the first embodiment of the present disclosure, includes a motor, a reading section that reads an image on a medium, a first transporting roller that transports the medium in a transport direction by driving force of the motor and that is provided upstream of the reading section in the transport direction, a second transporting roller that transports the medium in the transport direction by driving force of the motor and that is provided downstream of the reading section in the transport direction, and a measuring section configured to measure, using an encoder sensor, the rotational position of an encoder scale, wherein the encoder scale is provided on a rotation shaft of the second transporting roller.

According to the present aspect, the encoder scale is provided on the rotation shaft of the second transporting roller. Accordingly, even if there is a disturbance in the movement amount of the medium due to an instantaneous change in state when the rear end of the medium separates from the first transporting roller and changes to a transport state using only the second transporting roller, it is possible to detect information regarding the disturbance using the encoder scale. As a result, it is possible to reduce degradation of image quality.

In addition, by locating the encoder scale on the rotation shaft of the second transporting roller, the space efficiency is increased, which leads to the miniaturization of the apparatus.

A image reading device according to a second aspect of the present disclosure is an aspect according to the first aspect, wherein the first transporting roller has an upper first transporting roller and a lower first transporting roller that nips the medium with the upper first transporting roller at a first nip position and transports the medium, and the second transporting roller has an upper second transporting roller and a lower second transporting roller that nips the medium at a second nip position with the upper second transporting roller and transports the medium, the motor transmits driving force to rotation shafts of the upper first transporting roller, the lower first transporting roller, the upper second transporting roller, and the lower second transporting roller, a length of the apparatus in a depth direction at a position where the second transporting roller is provided is longer than a length of the apparatus in the depth direction at a position where the first transporting roller is provided, and the encoder scale is provided on a rotation shaft of the lower second transporting roller.

According to the present aspect, since the driving force is transmitted to the four rollers of the upper first transporting roller, the lower first transporting roller, the upper second transporting roller, and the lower second transporting roller, it is possible to measure the movement distance of the medium in a state where the transporting force is improved. As a result, slippage of the roller is suppressed, so that the measurement accuracy of the movement distance of the medium is improved.

In addition, since the encoder scale is provided on the rotation shaft of the lower second transporting roller having the largest depth margin among the four rollers, the space use efficiency is improved.

A image reading device according to a third aspect is an aspect according to the second aspect of the present disclosure, wherein driving force of the motor is transmitted to the lower first transporting roller and to the upper second transporting roller via the rotation shaft of the lower second transporting roller and is transmitted to the upper first transporting roller via the rotation shaft of the upper second transporting roller and the encoder scale is provided on the rotation shaft of the lower second transporting roller to which the driving force from the motor is transmitted first.

According to the present aspect, since the measuring section is disposed on the rotation shaft of the lower second transporting roller which is a driving shaft to which the driving force from the motor reaches first, the measurement accuracy of the movement distance of the medium is improved.

An image reading device according to a fourth aspect of the present disclosure is an aspect according to the second aspect or the third aspect, further including a universal joint provided on the rotation shaft of the upper second transporting roller, wherein the upper second transporting roller and the lower second transporting roller are provided between the universal joint and the encoder scale in a rotation shaft direction.

According to the present aspect, the upper second transporting roller and the lower second transporting roller are provided between the universal joint and the encoder scale in the rotation shaft direction. That is, since the universal joint and the encoder scale are provided on the opposite sides in the direction of the rotation shaft, the size of the apparatus can be reduced.

An image reading device according to a fifth aspect of the disclosure is an aspect according to the first aspect, wherein the second transporting roller includes a drive roller rotated by the motor, and a driven roller driven to rotate by the drive roller, the encoder scale is disposed on a rotation shaft of the drive roller.

According to the present aspect, since the encoder scale is disposed on the rotation shaft of the drive roller, it is possible to measure the movement distance of the medium.

An image reading device according to a sixth aspect of the disclosure is an aspect according to the first aspect, wherein the second transporting roller has a drive roller rotated by the motor and a driven roller configured to rotate together with the drive roller, and the encoder scale is disposed on a rotation shaft of the driven roller.

According to the present aspect, since the encoder scale is disposed on the rotation shaft of the driven roller, it is possible to more accurately measure the movement distance of the medium.

An image reading device according to a seventh aspect of the disclosure is an aspect according to any one of the first to sixth aspects, further including a medium detection section provided upstream of the reading section and a control section, wherein the control section measures, using the measuring section, current distance of after the medium passes through the medium detection section, calculates a differential distance between the current distance and a target distance stored in advance, specifies a position where the difference distance exists in the image data read by the reading section, and executes image correction on the specified position.

According to the present aspect, the control section specifies a position where the differential distance is present in the image data read by the reading section, and executes image correction on the specified position. By this image correction, it is possible to reduce the influence of the disturbance of the image, thereby reducing the deterioration of the image quality.

According to an eighth aspect of the present disclosure, the image reading device, according to any one of the fifth to seventh aspect of the present invention, wherein the first transporting roller has an upper first transporting roller and a lower first transporting roller that nips the medium with the upper first transporting roller at a first nip position and transports the medium, the second transporting roller has an upper second transporting roller and a lower second transporting roller that nips the medium with the upper second transporting roller at a second nip position and transports the medium, and the image correction is executed based on measurement information measured by the measuring section during a period from when a rear end of the medium passes through the first nip position to when the rear end of the medium passes through the second nip position.

According to this aspect, the image correction is executed based on the measurement information measured by the measuring section during a period from when the rear end of the medium passes through the first nip position to when the rear end of the medium passes through the second nip position. As a result, even if there is a disturbance in the movement amount of the medium due to an instantaneous change in state when the trailing end of the medium passes through the first nip position and changes to a cantilevered transport state due to only the second nip position, since the disturbance is detected and the image correction is executed, it is possible to reduce a decrease in image quality.

An image reading device according to a ninth aspect of the present disclosure is an aspect according to the first aspect, further including a third transporting roller that transports the medium in a transporting direction and that is provided downstream of the second transporting roller in the transporting direction, a first transporting path through which the medium is transported, the first transporting path including a portion from a nip position of the first transporting roller to a nip position of the second transporting roller, a second transporting path through which the medium is transported, the second transporting path including a portion from the nip position of the second transporting roller to a nip position of the third transporting roller, and a control section that controls transporting of the medium, wherein the motor has a DC motor, the first transporting path includes a straight path, the second transporting path includes a curved path, the control section stops transporting of the medium when a load of the DC motor exceeds a threshold value, and the threshold value when the medium is transported along the second transporting path is larger than the threshold value when the medium is transported along the first transporting path.

In this specification, the "straight path" does not need to be strictly a straight line, but includes a path that can be regarded as a substantially straight line.

According to the present aspect, in the control section, the threshold value in a case where the medium is transported on the second transporting path is larger than the threshold value in a case where the medium is transported on the first transporting path. That is, since a plurality of threshold values of the transporting load is provided, when the transportation of the medium is to be stopped, the transportation of the medium can be stopped earlier than in the prior art, thereby suppressing damage to the medium.

An image reading device according to a tenth aspect of the disclosure is an aspect according to the ninth aspect, further including a plurality of medium detection sections configured to detect that the medium has passed by each of the first transporting roller and the second transporting roller, wherein the control section executes based on a combination of the detection information from the plurality of the medium detection sections to increase the threshold as the number of detections increases, and to decrease the threshold as the number of detections decreases.

According to the aspect, the control section increases the threshold value when the number of detections increases, and decreases the threshold value when the number of detections decreases, based on the combination of the detection information of the plurality of medium detection sections. Accordingly, since a plurality of appropriate threshold values can be used, the transporting medium can be stopped earlier than in the case of using a fixed threshold value, and damage to the medium can be suppressed.

An image reading device according to an eleventh aspect of the present disclosure is an aspect according to the tenth aspect, wherein the control section uses the first threshold value in the first curved path having the first curvature and uses the second threshold value larger than the first threshold value in the second curved path having the second curvature larger than the first curvature.

According to the present aspect, the control section uses the first threshold value in the first curved path having the first curvature, and uses the second threshold value larger than the first threshold value in the second curved path having the second curvature larger than the first curvature. Accordingly, since it is possible to use a plurality of appropriate threshold values, it is possible to stop the transportation of the medium at an early stage and to suppress damage to the medium compared to a case where a fixed threshold value is used.

An image reading device according to a twelfth aspect of the disclosure is an aspect according to the tenth aspect, wherein the third transporting roller includes a lower third transporting roller that is driven by the motor and that transports the medium, and an upper third transporting roller that is driven to rotate by the lower third transporting roller and that transports the medium while nipping the medium with the lower third transporting roller at a third nip position, and the threshold value when the medium is transported by the first transporting roller or the second transporting roller may be larger than the threshold value when the medium is transported by only the third transporting roller.

According to the present aspect, the threshold value in a case where the medium is transported by the first transporting roller or the second transporting roller is larger than the threshold value in a case where the medium is transported only by the third transporting roller. Accordingly, since it is possible to use a plurality of appropriate threshold values according to the transporting load, it is possible to stop the transportation of the medium at an early stage and to suppress damage to the medium compared to a case where a fixed threshold value is used.

An image reading device according to a thirteenth aspect of the present disclosure is an aspect according to the ninth aspect, wherein the first transporting path and the second transporting path overlap with a portion of the encoder scale in the side viewing direction.

According to the present aspect, the first transporting path and the second transporting path are disposed so as to overlap with a portion of the encoder scale in the side viewing direction. That is, by disposing the encoder scale in the first transporting path and the second transporting path, the space efficiency is increased, which leads to the miniaturization of the apparatus.

According to a fourteenth aspect, an image correction method of an image reading device, the image reading device having a motor, a reading section configured to read an image on a medium, a first transporting roller that transports the medium in a transport direction by driving force of the motor and that is provided upstream of the reading section in the transport direction, a second transporting roller that transports the medium in the transport direction by driving force of the motor and that is provided downstream of the reading section in the transport direction, and a measuring section configured to measure, using an encoder sensor, the rotational position of an encoder scale, wherein the encoder scale is mounted on a rotation shaft of the second transporting roller and a medium detection section is provided upstream of the reading section, the image correction method includes measuring, using the measuring section, a current distance of after the medium passes through the medium detection section by the control section performing, calculating a differential distance between the current distance and a target distance stored in advance, specifying a position where a difference distance exists in the image data read by the reading section, and executing an image correction on the specified position by the control section.

According to the present aspect, the same effect as that of the seventh aspect can be obtained.

An image correction method of an image reading device according to a fifteenth aspect of the present disclosure is an aspect according to a fourteenth aspect, the image reading device has a third transporting roller that transports the medium in a transporting direction and that is provided downstream of the second transporting roller in the transporting direction, a first transporting path through which the medium is transported, the first transporting path having a portion from a nip position of the first transporting roller to a nip position of the second transporting roller, a second transporting path through which the medium is transported, the second transporting path having a portion from the nip position of the second transporting roller to a nip position of the third transporting roller, and the control section that control to transport the medium, wherein the motor includes a DC motor, the first transporting path includes a straight path, and the second transporting path includes a curved path, the control section controls stopping transportation of the medium when a load of the DC motor exceeds a threshold value, and executing a threshold value in a case where the medium is transported on the second transporting path is set to be larger than a threshold value in a case where the medium is transported on the first transporting path, using the control section.

According to the present aspect, the same effect as that of the ninth aspect can be obtained.

First Embodiment

An image reading device according to a first embodiment of the present disclosure will be described below in detail with reference to FIGS. 1 to 5.

In the following description, three axes orthogonal to each other are referred to as an X-axis, a Y-axis, and a Z-axis, respectively, as shown in the FIGS. 1 to 6. The direction indicated by the arrows of the three axes (X, Y, Z) is the "+" direction of each direction, and the opposite direction is the "–" direction. The Z axis direction corresponds to a vertical direction, that is, a direction in which gravity acts, a +Z direction indicates a vertically upward direction, and a –Z direction indicates a vertically downward direction. The X axis direction and the Y axis direction correspond to horizontal directions. The +Y direction indicates the front direction of the apparatus, and the –Y direction indicates the rear direction of the apparatus. The +X direction indicates the right direction of the apparatus, and the –X direction indicates the left direction of the apparatus.

The image reading device according to the present embodiment is a scanner capable of reading an image on a medium. Here, image means what is visually recorded on the medium, and is, for example, a character, a figure, a table, a picture, a photograph, or the like. The medium is not limited to a sheet, and may be a card, a booklet, or the like.

As illustrated in FIGS. 1 to 4, an image reading device 1 includes a motor 3, a reading section 7 that reads an image of a medium 5, a first transporting roller 9 that transports the medium 5 in a transport direction F along a transporting path 21 by a driving force of the motor 3 and that is provided upstream of the reading section 7 in the transport direction F, and a second transporting roller 11 that transports the medium 5 in the transport direction F by a driving force of the motor 3 and that is provided downstream of the reading section 7 in the transport direction F.

Further, a measuring section 17 for measuring the rotational position of an encoder scale 13 with an encoder sensor 15 is provided. The encoder scale 13 is provided on a rotation shaft 19 of the second transporting roller 11.

Figure 3:
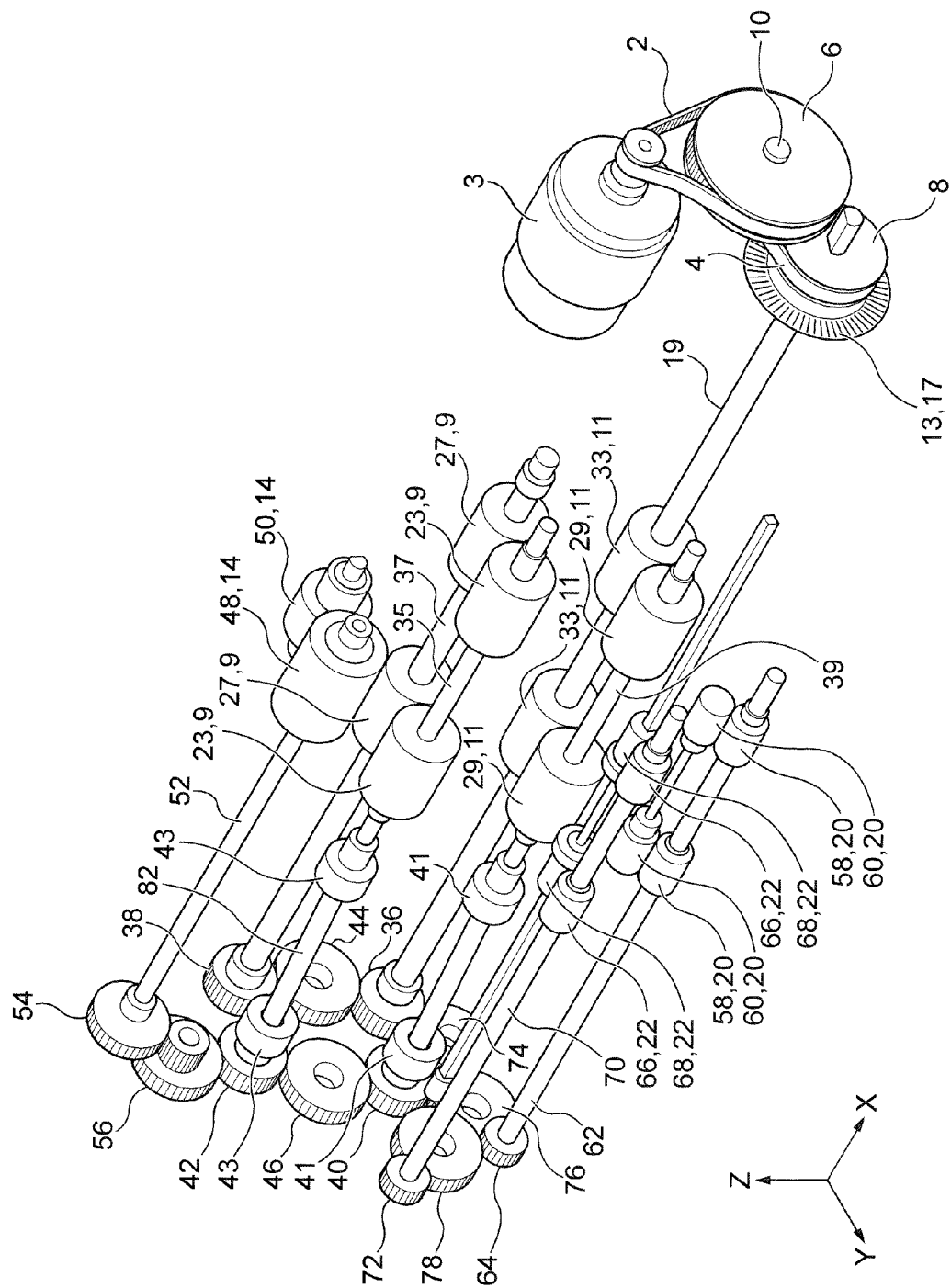
FIG. 3 is a schematic perspective view of a main portion inside the apparatus of the first embodiment.

As shown in FIG. 3, the driving force of the motor 3 is transmitted from a belt 2 to a gear 6, and further to a gear 8 via a belt 4 from a gear which is a small-diameter gear attached to a shaft 10 of the gear 6, but which cannot be seen in the drawing because it is hidden behind the gear 6. Since the gear 8 is integrally attached to the rotation shaft 19, the driving force of the motor 3 is transmitted to the rotation shaft 19 to rotate, thereby rotating the second transporting roller 11.

Figure 2:
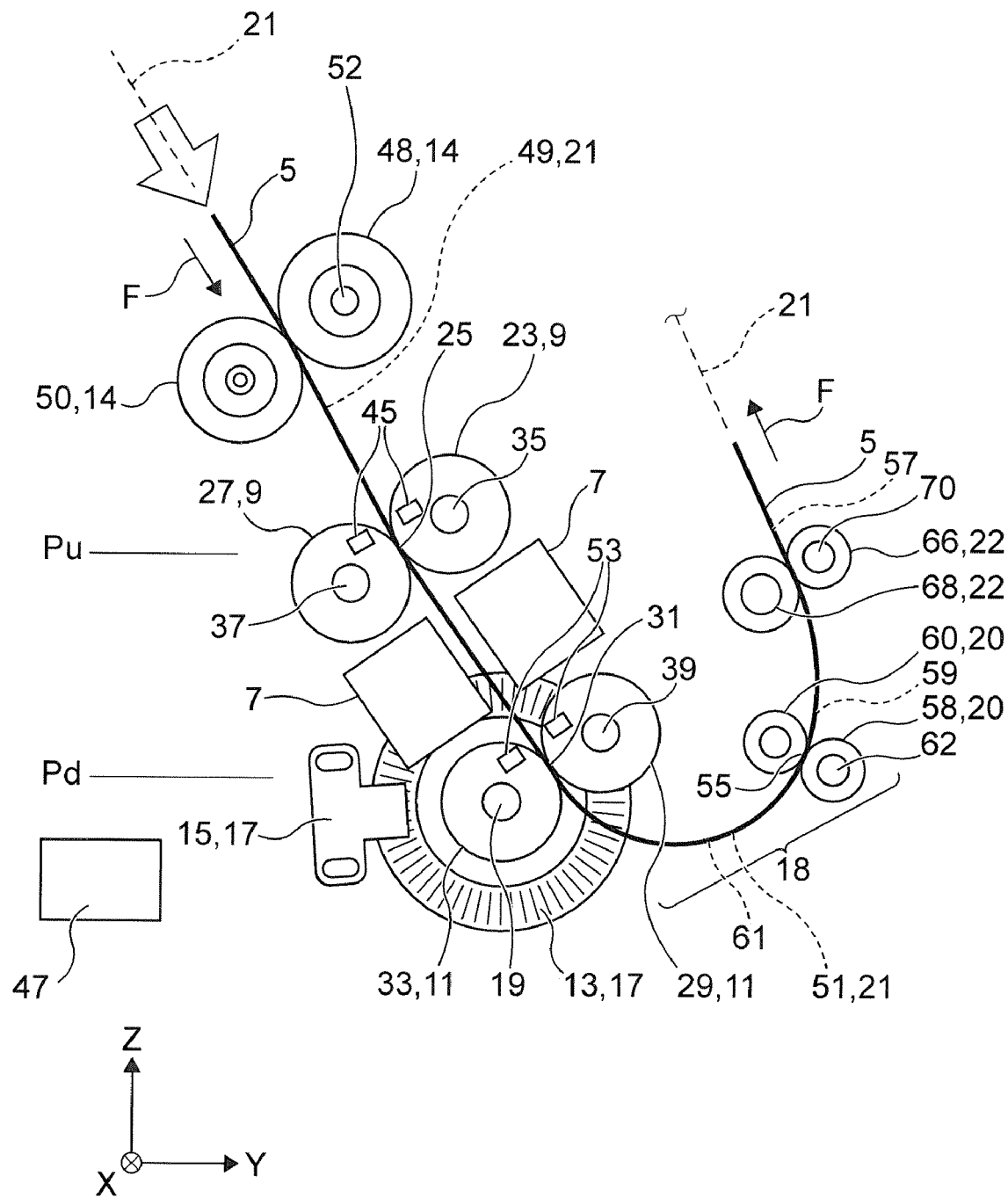
FIG. 2 is a schematic side sectional view of a main portion inside the apparatus of the first embodiment.

As illustrated in FIGS. 1 and 2, a feed roller 14, which feeds the medium 5 set in a medium support section 12 (FIG. 1) in the transport direction F toward the first transporting roller 9, is disposed upstream of the first transporting roller 9 in the transport direction F. Reference numeral 16 denotes a transporting inlet of the medium 5.

In the present embodiment, a reversing section 18, which forms a portion of the transporting path 21, is provided downstream of the second transporting roller 11 in the transport direction F. An intermediate roller 20 is disposed at a downstream end portion of the reversing section 18, and a discharge roller 22 is disposed further downstream thereof. The medium 5 discharged through the discharge roller 22 is supported and held by a receiving plate 26 of a discharge receiving section 24 (FIG. 1).

As shown in FIG. 1, the medium support section 12 is provided with an extension support section 28. The extension support section 28 is located on the back side of a medium support plate 30 of the medium support section 12 and substantially at the center in the width direction (X axis direction), and is formed of a substantially plate-shaped member that is long and narrow as a whole. The extension support section 28 has a first extension section 32 which is displaceable between a stored state (not shown) in which the extension support section 28 is stored in the medium support section 12 and a developed state (state of FIG. 1) in which the extension support section 28 is developed by being rotated with respect to the medium support section 12 and supports the medium 5 together with the medium support section 12.

Furthermore, the extension support section 28 has a second extension section 34 which is displaceable into a stored state (not shown) in which the extension support section 28 is stored in the first extension section 32 and a developed state (the state of FIG. 1) in which the extension support section 28 slides and extends from the first extension section 32 and supports the medium 5 together with the first extension section 32.

In the present embodiment, each of the first transporting roller 9 and the second transporting roller 11 is constituted by a nip roller pair that nips and transports the medium 5. Specifically, the first transporting roller 9 includes an upper first transporting roller 23 and a lower first transporting roller 27 that transports the medium 5 by nipping the medium 5 with the first transporting roller 23 at a first nip position 25. The second transporting roller 11 includes an upper second transporting roller 29 and a lower second transporting roller 33 that nips the medium 5 with the upper second transporting roller 29 at a second nip position 31 and transports the medium 5.

The motor 3 is configured to transmit a driving force to all of rotation shafts 35, 37, 39, and 19 corresponding to the upper first transporting roller 23, the lower first transporting roller 27, the upper second transporting roller 29, and the lower second transporting roller 33, respectively.

Note that as shown in FIG. 3, each of the upper first transporting roller 23, the lower first transporting roller 27, the upper second transporting roller 29, and the lower second transporting roller 33 is composed of two rollers located at two locations spaced apart from each other in the axial direction of the rotation shafts 35, 37, 39, and 19.

In the embodiment, the encoder scale 13 is provided on the rotation shaft 19 of the lower second transporting roller 33.

The dimensions of the outer shape of the image reading device 1 in the depth direction are formed as follows. That is, as shown in FIG. 1, the length Ld in the depth direction of the image reading device 1 at the position Pd (FIGS. 1 and 2), where the second transporting roller 11 is provided, is longer than the length Lu in the depth direction of the image reading device 1 at the position Pu (FIGS. 1 and 2), where the first transporting roller 9 is provided, that is, Ld>Lu.

In other words, the second transporting roller 11 is disposed inside the image reading device 1 at a position where the dimension in the depth direction is longer than at the position of the first transporting roller 9.

Note that the encoder scale 13 may be provided on the rotation shaft 39 of the upper second transporting roller 29. As a power transmission path from the motor 3, the power may be transmitted to one of the rotation shafts 35 or 37 of the first transporting roller 9, and then transmitted to the rotation shafts 19 and 39 of the second transporting roller 11 via a transmission gear.

Two Wheel Drive

In the present embodiment, as described above, two wheel drive configuration is adopted in which all of the upper first transporting roller 23, the lower first transporting roller 27, the upper second transporting roller 29, and the lower second transporting roller 33 are rotated by one motor 3.

Figure 4:
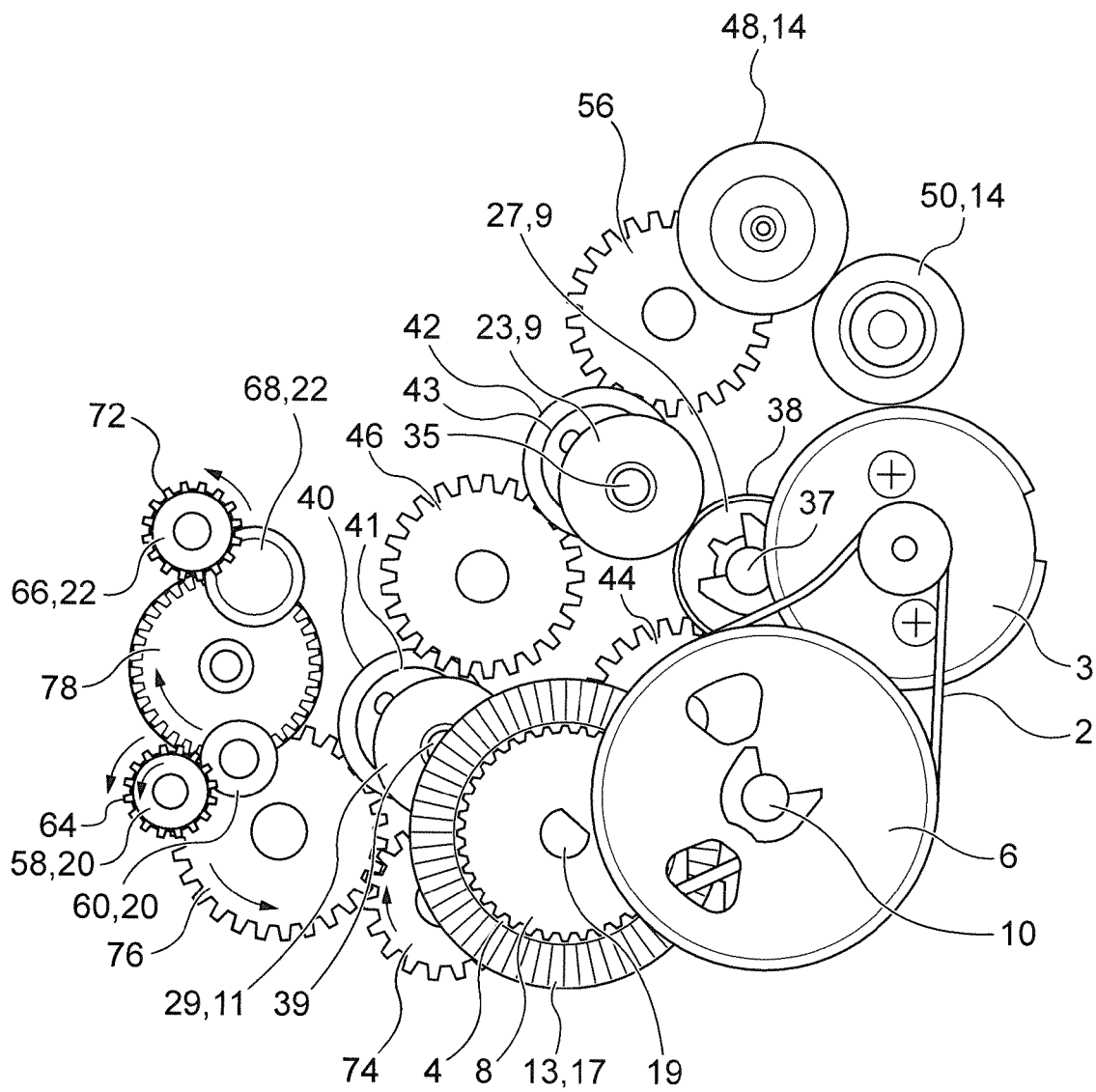
FIG. 4 is a schematic side cross-sectional view of a main portion of the inside of the apparatus of the first embodiment as viewed from a direction opposite to FIG. 2.

The structure of the two wheel drive is specifically configured as follows. As shown in FIGS. 3 and 4, the driving force of the motor 3 is transmitted to the lower first transporting roller 27 and the upper second transporting roller 29 via the rotation shaft 19 of the lower second transporting roller 33. Further, it is transmitted to the upper first transporting roller 23 via the rotation shaft 39 of the upper second transporting roller 29.

Here, a gear 36 is mounted on the −X direction end portion of the rotation shaft 19. A gear 38, a gear 40, and a gear 42 are mounted on the −X direction end portions of the rotation shaft 37, the rotation shaft 39, and the rotation shaft 35, respectively. The rotation of the gear 36 is transmitted to the gear 38 through a transmission gear 44. The rotation of the gear 36 is directly transmitted to the gear 40. The rotation of the gear 40 is transmitted to the gear 42 via a transmission gear 46.

As shown in FIG. 3, the encoder scale 13 is provided on the rotation shaft 19 of the lower second transporting roller 33, to which the driving force from the motor 3 is first transmitted.

The feed roller 14 includes a drive roller 48 and a retard roller 50. In this embodiment, as shown in FIG. 3, the driving force of the motor 3 is also transmitted to the feed roller 14. Specifically, a gear 54 is mounted on the −X direction end portion of a rotation shaft 52 of the drive roller 48. The rotation of the gear 42 is transmitted to the gear 54 via the transmission gear 56. The intermediate roller 20 is constituted by a pair of a drive roller 58 and a driven roller 60. A gear 64 is mounted on the −X direction end portion of a rotation shaft 62 of the drive roller 58. The discharge roller 22 is constituted of a pair of a drive roller 66 and a driven roller 68. A gear 72 is mounted on the −X direction end portion of a rotation shaft 70 of the drive roller 66. Rotation of the gear 36 is transmitted to a transmission gear 74, a transmission gear 76, and a transmission gear 78 in this order, and is transmitted from the last transmission gear 78 simultaneously to the gear 64 and the gear 72.

In the embodiment, as shown in FIGS. 3 and 4, the upper second transporting roller 29 and the lower second transporting roller 33 are provided between a universal joint 41, which is a universal coupling, and the encoder scale 13 in the direction of the rotation shaft 39.

Here, the rotation shaft 35 of the upper first transporting roller 23 is also provided with universal joints 43 and 43. The universal joints are provided on both sides for transmission shafts 80 and 82, so that the upper first transporting roller 23 and the upper second transporting roller 29 can be driven by the motor 3 while being displaced with respect to the opposing rollers.

In the present embodiment, a medium detection section 45 and a control section 47 are provided upstream of the reading section 7.

The medium detection section 45 is disposed near the first nip position 25 of the first transporting roller 9, and is configured to accurately detect the timing at which the leading end and the trailing end of the medium 5 pass through the nip position 25. Here, an optical sensor is used as the medium detection section 45, and the medium detection section 45 is configured by a known pair of a light emitting section and a light receiving section.

The control section 47 includes a CPU, a flash ROM, and a RAM. The CPU performs various kinds of arithmetic processing in accordance with a program stored in the flash ROM and controls the operation of the entire image reading device 1. A flash ROM, which is an example of the storage means, is a nonvolatile memory capable of reading and writing. Various kinds of information are temporarily stored in the RAM, which is an example of the storage means.

The control section 47 uses the measuring section 17, including the encoder scale 13 and the encoder sensor 15, to measure a current distance b after the medium 5 passes through the medium detection section 45, and uses a calculation section (not illustrated) to calculate a difference distance c between the current distance b and a target distance a, which is stored in advance. Then, in the image data read by the reading section 7, a position at which the difference distance c exists is specified, and image correction is performed on the specified position. Here, the control section also controls the driving of the motor 3. That is, it controls the operation of each transporting roller.

Figure 6:
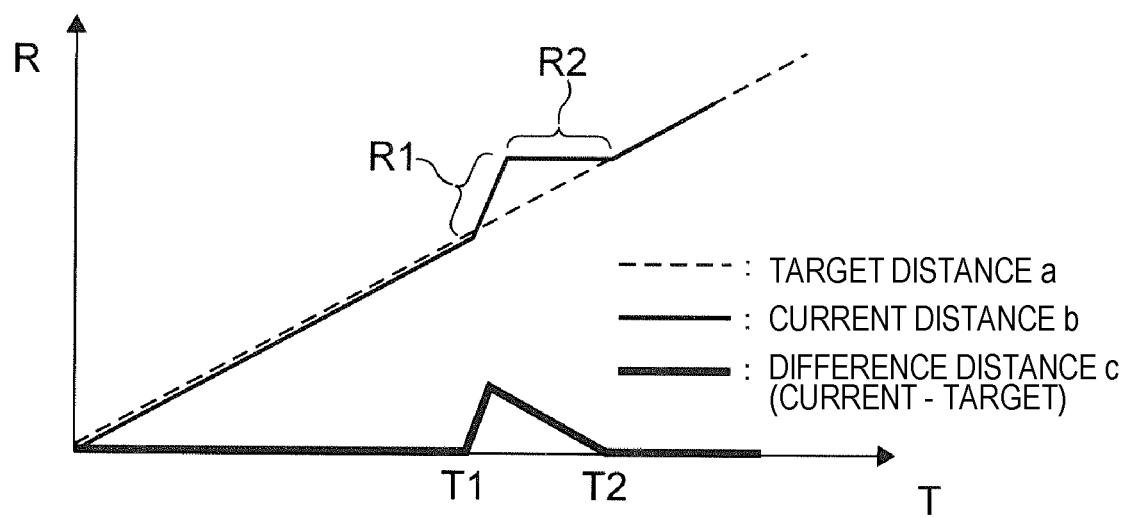
FIG. 6 is a diagram illustrating a disturbance in the amount of movement of the medium due to an instantaneous change in state when the trailing edge of the medium passes through the first transporting roller in the first embodiment.

FIG. 6 is a graph in which the horizontal axis represents the time T elapsed since the start of measurement by the medium detection section 45 and the vertical axis represents the distance R that the medium 5 has moved. Here, a case is shown in which from time T1 to time T2, there is a portion R1 whose movement distance is larger than that immediately before and a portion R2 whose movement distance is smaller than that immediately before.

Figure 7A:
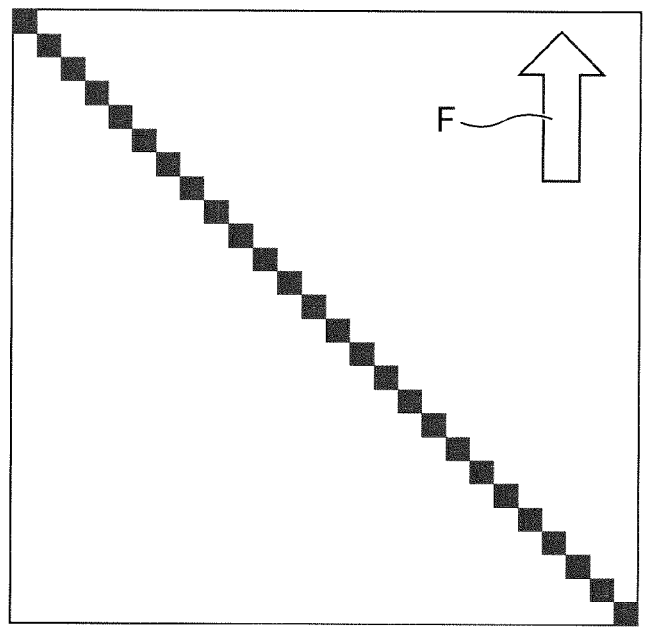
FIG. 7A is a diagram showing an image in the case where there is no fluctuation in the amount of movement in the first embodiment.
Figure 7B:
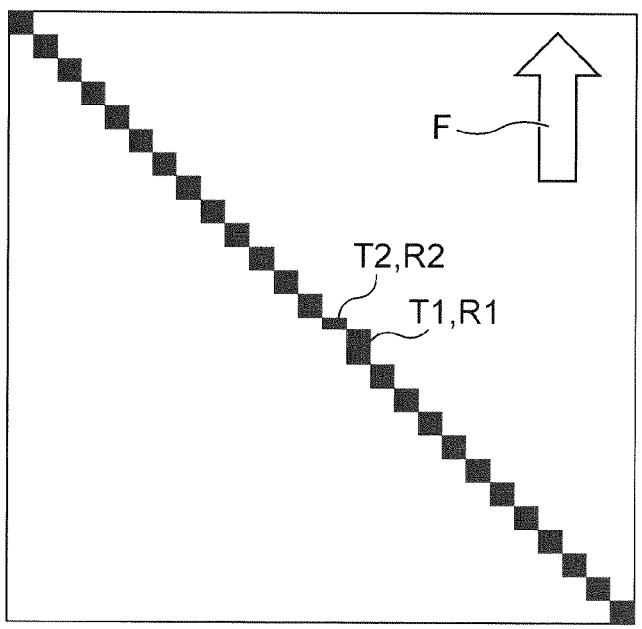
FIG. 7B is a diagram showing an image in the case where there is fluctuation.

FIGS. 7A and 7B show the measurement result of FIG. 6 in terms of the shape change of the pixel. FIG. 7A shows a case where there is no differential distance c, that is, a case where the differential distance c is zero as a result of substantially regular movement at a target distance a, and FIG. 7B shows a case where there is a differential distance c, that is, the state shown in FIG. 6.

Figure 8:
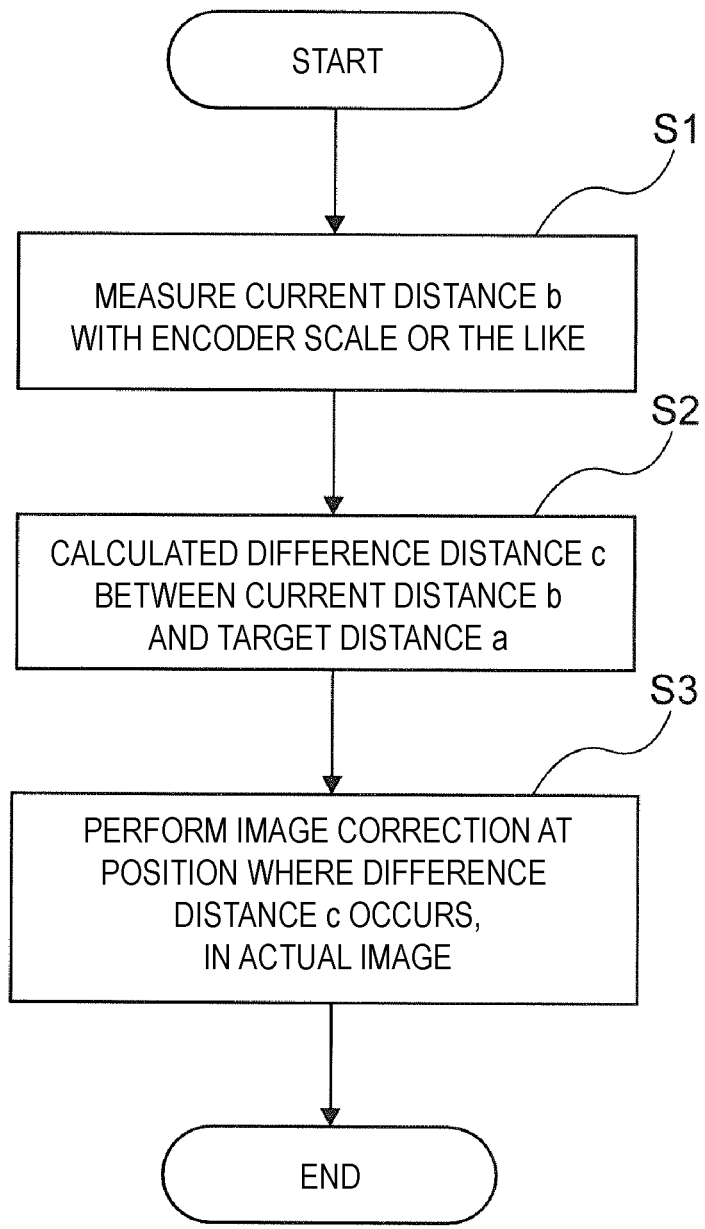
FIG. 8 is a flowchart for explaining image correction according to the first embodiment.

FIG. 8 is a flowchart for explaining an image correction method performed by the control section 47. First, in step S1, the current distance b, which is the distance by which the medium 5 has moved from the preset measurement start position, is measured by the measuring section 17 using the encoder scale 13 or the like. Subsequently, in step S2, a differential distance c, which is the difference between the current distance b and the target distance a, is calculated. Next, in Step S3, a position where the difference distance c is generated in the actual image read by the reading section 7 is specified. Further, image correction is performed on the image at that position, wherein the image correction is correcting the image data of FIG. 7B as shown in FIG. 7A. Note that the image correction is not limited to a specific correction method. For example, image correction may be performed by thinning out pixels at the specified positions.

In the present embodiment, as shown in FIG. 2, a medium detection section 53 is also disposed near the second nip position 31 of the second transporting roller 11.

The control section 47 is configured to execute the image correction based on measurement information measured by the measuring section 17 during a period from when the rear end of the medium 5 passes through the first nip position 25 to when the rear end of the medium 5 passes through the second nip position 31. In other words, in a state where the rear end of the medium 5 has passed by the first transporting roller 9 and the medium 5 is transported while the rear end side of the medium 5 is supported only by the second transporting roller 11, the image of the medium 5 read by the reading section 7 is set as a target of image correction.

In the present embodiment, as shown in FIGS. 2 and 4, the encoder scale 13 is disposed so as to overlap with a portion of the second transporting roller 11 in the side view direction (X axis direction). In addition, a portion of the encoder scale 13 is disposed so as to overlap with the lower second transporting roller 33 in the side view direction. In addition, a portion of the encoder scale 13 is disposed so as to overlap with the reading section 7 in the side viewing direction. In addition, a portion of the encoder scale 13 is disposed so as to overlap with the transmission gear 44 and the transmission gear 74 in the side viewing direction (FIG. 4). In addition, the encoder scale 13 is disposed so as to overlap with the gear 6 to which power is transmitted from the motor 3 via the belt 2 in the direction of the rotation shaft 19. The encoder scale 13 and the motor 3 are disposed on the inner side (−X direction) of the belts 2 and 4.

Description of Effects of the First Embodiment (1) In the present embodiment, since the encoder scale 13 is provided on the rotation shaft 19 of the second transporting roller 11, even when there is a disturbance in the movement amount of the medium 5 due to an instantaneous change in state when the rear end of the medium 5 passes beyond the first transporting roller 9, it is possible to detect the disturbance. Thus, it is possible to reduce the deterioration of the image quality.

Since the encoder scale 13 is disposed on the rotation shaft 19 of the second transporting roller 11, the space efficiency is increased, which leads to miniaturization of the apparatus.

(2) According to the present embodiment, since the driving force is transmitted to the four rollers of the upper first transporting roller 23, the lower first transporting roller 27, the upper second transporting roller 29, and the lower second transporting roller 33, it is possible to measure the movement distance of the medium 5 in a state where the transporting force is improved. As a result, slippage of the rollers is suppressed, so that the measurement accuracy of the moving distance of the medium 5 is improved.

In addition, since the encoder scale 13 is provided on the rotation shaft 19 of the lower second transporting roller 33 having the greatest amount of margin in the depth direction among the four rollers, the space utilization efficiency is improved.

(3) According to the present embodiment, since the measuring section 17 is disposed on the rotation shaft 19 which is a driving shaft to which the driving force from the motor 3 reaches previously, the measurement accuracy of the movement distance of the medium 5 is improved.

(4) According to the present embodiment, the upper second transporting roller 29 and the lower second transporting roller 33 are provided between the universal joints 41, 43 and the encoder scale 13 in the rotation axis direction. That is, since the universal joints 41 and 43 and the encoder scale 13 are provided on opposite sides in the rotational axis direction, the size of the apparatus can be reduced.

(5) According to the present embodiment, the control section 47 specifies the position where the difference distance c is present in the image data read by the reading section 7, and executes the image correction on the specified position. By this image correction, it is possible to reduce the influence of the disturbance of the image, thereby reducing the deterioration of the image quality.

(6) According to the present embodiment, the image correction is executed based on the measurement information measured by the measuring section 17 during a period from when the rear end of the medium 5 passes through the first nip position 25 to when the rear end of the medium 5 passes through the second nip position 31. By this, even if there is a disturbance in the movement amount of the medium 5 due to an instantaneous change in state when the rear end of the medium 5 passes through the first nip position 25 and the medium 5 changes to transport state of only one end being held by the second nip position 31, image correction is executed by detecting the disturbance, and thus it is possible to reduce deterioration in image quality.

Second Embodiment

An image reading device 1 according to the second embodiment will be described below. The same portions as those in the first embodiment are denoted by the same reference numerals, and the description of the configuration and the corresponding effects is omitted.

Figure 5A:
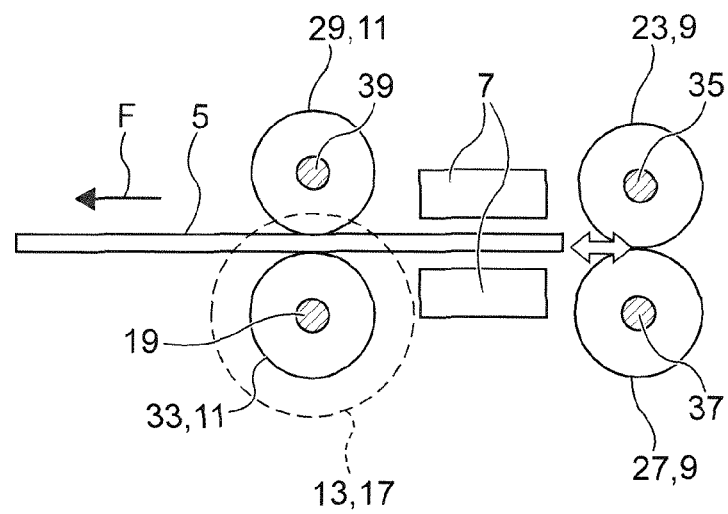
FIGS. 5A and 5B schematically illustrate main portions of two modifications of the first embodiment.

In the present embodiment, the second transporting roller 11 consists of a drive roller 33 (it is indicated by the same reference numeral 33 because it corresponds to the lower second transporting roller 33 in FIG. 2) rotated by the motor 3, and the driven roller 29 (it is indicated by the same reference numeral 29 because it corresponds to the upper second transporting roller 29 in FIG. 1) driven and rotated by the driving roller 33. In other words, in the first embodiment, the second transporting roller 11 has a two wheel drive structure as described above, but in the present embodiment, the second transporting roller 11 is formed to have a non-two wheel drive or one wheel drive configuration in which one of the rollers is the driven roller 29. As shown in FIG. 5A, the encoder scale 13 is disposed on the rotation shaft 19 of the drive roller 33.

Figure 5B:
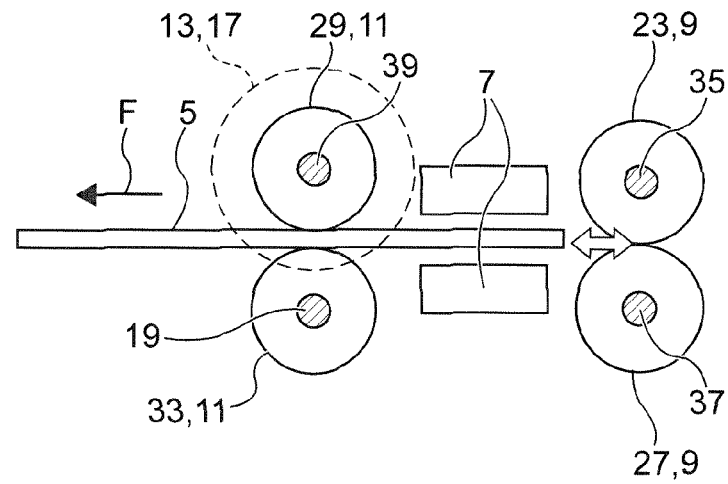

As shown in FIG. 5B, the encoder scale 13 may be arranged on the rotation shaft 39 of the driven roller 29.

According to the present embodiment, since the encoder scale 13 is disposed on the rotation shaft 19 of the drive roller 33, it is possible to measure the movement distance of the medium 5.

In a case where the encoder scale 13 is disposed on the rotation shaft 39 of the driven roller 29, it is possible to more accurately measure the movement distance of the medium 5.

Third Embodiment

Hereinafter, an image reading device 1 according to the third embodiment will be described with reference to FIGS. 2 and 9. The same portions as those in the first embodiment are denoted by the same reference numerals, and the description of the configuration and the corresponding effects is omitted.

As shown in FIG. 2, in the present embodiment, the medium 5 is transported in the transport direction F and with respect to the transport direction F, it is provided with a third transporting roller 20, which is the intermediate roller 20 provided downstream of the second transporting roller 11, a first transporting path 49 that is for transporting the medium 5 and that includes from the nip position 25 of the first transporting roller 9 to the nip position 31 of the second transporting roller 11, and a second transporting path 51 that is for transporting the medium 5 and that includes from the nip position 31 of the second transporting roller 11 to a nip position 55 of the third transporting roller 20.

In the present embodiment, the motor 3 is a DC motor, the first transporting path 49 includes a linear path, and the second transporting path 51 includes a curved path.

Figure 9A:
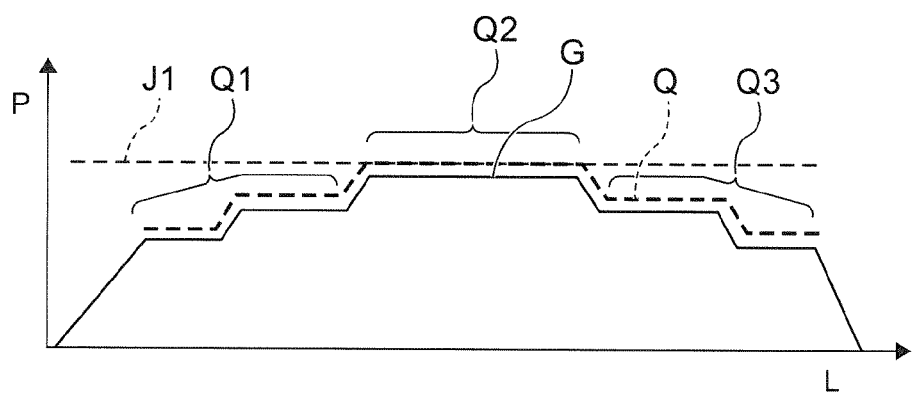
FIGS. 9A and 9B are diagrams for explaining a method of determining the position of the medium in the transporting path and the threshold value for stopping the transportation according to the second embodiment.

Then, as shown in FIG. 9A, the control section 47 stops the transport of the medium 5 when the load G of the DC motor 3 exceeds the threshold value Q. A threshold value Q2 when the medium 5 is transported along the second transporting path 51 is set to be larger than a threshold value Q1 when the medium 5 is transported along the first transporting path 49. Specifically, it is desirable that the threshold value Q2 of the second transporting path is used when the leading end of the medium 5 enters the second transporting path 51, and the threshold value Q1 of the first transporting path 49 is used before that.

Figure 9B:
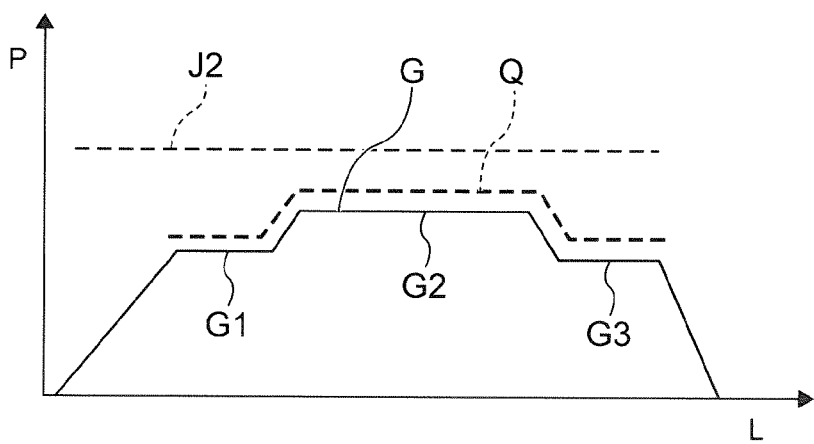

In FIGS. 9A and 9B, the horizontal axis represents the transport distance L and the vertical axis represents the transporting load P. In other words, since the transporting load of the DC motor 3 is larger in the case where the transporting path is the "curved path" than in the case where the transporting path is the "straight path", the threshold value is set in accordance with a change in the magnitude of the transporting load.

Here, since a third transporting path 57 downstream of the second transporting path 51 can also be said to be a "straight path", the threshold value Q3 of that portion is set smaller than the threshold value Q2.

In FIG. 9A, the thresholds Q1 and Q3 are not flat but stepwise for the following reason. That is, as shown in FIG. 9B, the load G of the DC motor 3 is larger in the state G2 in which the medium 5 is transported by two rollers than in the state G1 in which the medium 5 is transported by one transporting roller. This point will be further described later.

In this specification, the "straight path" does not need to be strictly a straight line, but includes a path that can be regarded as a substantially straight line.

Note that in FIG. 9, reference characters J1 and J2 indicate related art's thresholds which are set regardless of a change in the transporting load.

In the present embodiment, as shown in FIG. 2, two medium detection sections 45 and 53 are provided to detect that the leading end and the trailing end of the medium 5 have passed through the first transporting roller 9 and the second transporting roller 11, respectively. The control section 47 is configured to, based on the combination of the detection information of the medium detection sections 45 and 53, raise the threshold Q when the number of detections increases and to lower the threshold Q when the number of detections decreases.

In other words, based on the combination of detection information from the medium detection sections 45 and 53, a state in which the medium 5 is transported by only the first transporting roller 9 (G1 in FIG. 9B), a state in which the medium 5 is transported by both of the first transporting roller 9 and the second transporting roller 11, that is, a state in which "the number of detections increases" (G2 in FIG. 9B), and a state in which the medium 5 is transported by only the second transporting roller 11 (G3 in FIG. 9B) can be distinguished. Since this distinction can be made, the threshold value can be raised or lowered as described above.

That is, as described above with reference to FIG. 9A, the thresholds Q1 and Q3 are not flat but stepwise.

If there are three or more transport rollers, three or more medium detection sections may be provided in accordance with the number of transporting rollers.

In the present embodiment, as shown in FIG. 2, the second transporting path 51 includes a first curved path 59 having a first curvature and a second curved path 61 having a second curvature larger than the first curvature. Accordingly, the transporting load of the DC motor 3 when the medium 5 is transported on the second curved path 51 is larger than the transporting load of the DC motor 3 when the medium 5 is transported on the first curved path 59.

The control section 47 is configured to use a first threshold value in the first curved path 59 having the first curvature, and use a second threshold value larger than the first threshold value in the second curved path 51 having the second curvature.

In a case where the medium 5 is transported across both the second curved path 61 and the second curved path 51, a second threshold value which is a larger one of the threshold values Q may be used.

In the present embodiment, the third transporting roller 20 includes a lower third transporting roller 58 which is the drive roller 58 which is driven by the motor 3 and transports the medium 5, and an upper third transporting roller 60 which is a driven roller 60 which is driven and rotated by the lower third transporting roller 58 and transports the medium 5 by interposing the medium 5 between the lower third transporting roller 58 and the third nip position 55.

The threshold value Q when the medium 5 is transported by the first transporting roller 9 or the second transporting roller 11 is set to be larger than the threshold value when the medium 5 is transported only by the third transporting roller 20.

In the present embodiment, as shown in FIG. 2, the first transporting path 49 and the second transporting path 51 are disposed so as to overlap with a portion of the encoder scale 13 in the side viewing direction. The encoder scale 13 is disposed so as to overlap with a portion of the second curved path in the side viewing direction.

Difference in Thickness of Medium and Threshold Values

Figures 10A, 10B:
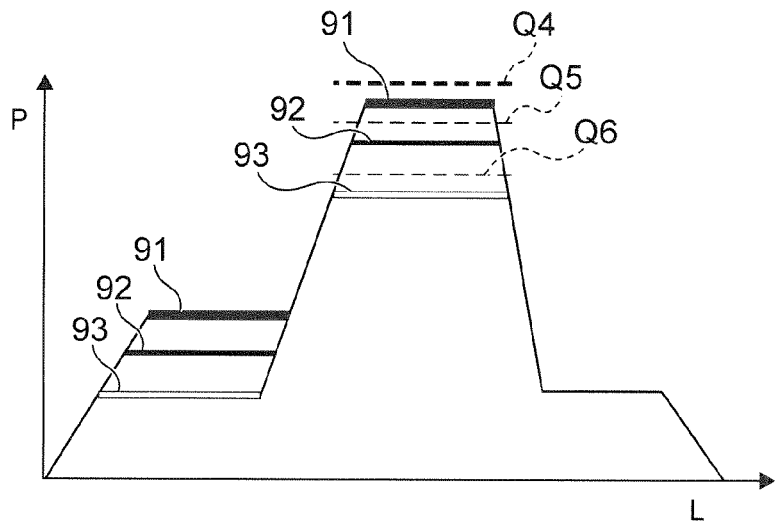
FIGS. 10A and 10B are diagrams for explaining a method of determining a threshold value for stopping the transportation due to a difference in the thickness of the medium.

FIGS. 10A and 10B show that different threshold values Q are set for a thick medium and a thin medium of the medium 5.

Reference numeral 91 indicates a transporting load of a thick medium, reference numeral 92 indicates a transporting load of a thin medium, and reference numeral 93 indicates a transporting load in a state where the medium 5 is not present. The transporting load corresponds to the transporting force of the DC motor 3. In FIG. 10A, the difference between the transporting loads 91, 92, and 93 on the left side corresponds to a state where the medium 5 is transported only by the feeding roller (ALD) 14. The transporting loads 91, 92, and 93 in the central portion of FIG. 10A indicate a state in which the medium 5 is further transported by the first transporting roller (ADF) 9 and the second transporting roller (ADF) 11. As illustrated in FIG. 10B, the difference in the transporting load only by the feed roller 14 is also affected in a state where the medium 5 is transported by the first transporting roller 9 or the like, and a similar difference occurs.

Therefore, different threshold values Q4, Q5, and Q6 are set so that the difference is constant (the difference value of 100 in FIG. 10B), such that the threshold value Q is Q4 for a thick medium, Q5 for a thin medium, and Q6 when there is no medium.

Two Wheel Drive, One Wheel Drive, and Thresholds

FIG. 11 shows that different threshold values Q are set for two wheel drive and one wheel drive of the first transporting roller 9 and the like.

Figure 11A:
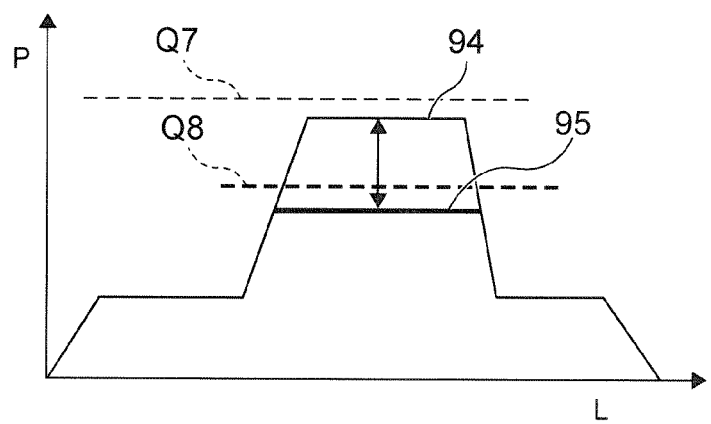
FIG. 11A is a diagram for explaining how to determine thresholds for stopping transportation in the case where the first transporting roller and the second transporting roller are two wheel driven and in the case where one wheel driven.

In FIG. 11A, reference numeral 94 denotes the transporting load in the case of the one wheel drive, and reference numeral 95 denotes the transporting load in the case of two wheel drive. In two wheel drive, since the transporting force of the DC motor 3 with respect to the medium 5 increases, the transporting load becomes smaller than that in the one wheel drive.

Therefore, the threshold value Q is set to a different value, for example, Q7 for one wheel drive and Q8 for two wheel drive.

Figure 11B:
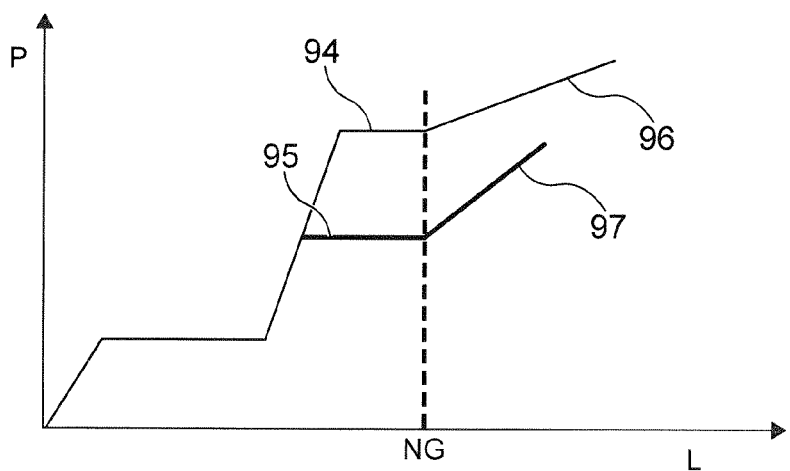
FIG. 11B is a diagram for explaining the effect thereof.

FIG. 11B shows a case where medium clogging occurs at the position NG. As shown in the figure, since the rising action 97 of the transporting load 95 with two wheel drive is faster than the rising action 96 of the transporting load 94 with one wheel drive, the responsiveness of the detection of the medium jam is improved.

Description of Effects of the Third Embodiment (1) In the present embodiment, the control section 47 determines that the threshold value Q2 when the medium 5 is transported along the second transporting path 51 is larger than the threshold value when the medium 5 is transported along the first transporting path 49. That is, since a plurality of threshold values of the transporting load is provided, when the transport of the medium 5 has to be stopped, the transport of the medium 5 can be stopped earlier than in the prior art, thereby suppressing damage to the medium 5.

(2) According to the present embodiment, based on the combination of the detection information of the plurality of medium detection sections 45 and 53, the control section 47 increases the threshold value Q when the number of detections increases, and decreases the threshold value Q when the number of detections decreases. Accordingly, since a plurality of appropriate threshold values can be used, the conveyance can be stopped earlier than in the case of using a fixed threshold value, and damage to the medium 5 can be suppressed.

(3) According to the present embodiment, the control section 47 uses the first threshold value in the first curved path 59 having the first curvature, and uses the second threshold value larger than the first threshold value in the second curved path 61 having the second curvature larger than the first curvature. By this, since it is possible to use a plurality of appropriate threshold values, it is possible to stop the transport of the medium 5 at an early stage and to suppress damage to the medium 5 compared to a case where a fixed threshold value is used.

(4) According to the present embodiment, the threshold value Q in a case where the medium 5 is transported by the first transporting roller 9 or the second transporting roller 11 is larger than the threshold value in a case where the medium 5 is transported by only the third transporting roller 20. Accordingly, since it is possible to use a plurality of appropriate threshold values according to the transporting load, it is possible to stop the transport of the medium 5 earlier than in a case where a fixed threshold value is used, and to suppress damage to the medium 5.

(5) According to the embodiment, the first transporting path 49 and the second transporting path 51 are disposed so as to overlap with a portion of the encoder scale 13 in the side viewing direction. That is, by arranging the encoder scale 13 so as to partially overlap with the first transporting path 49 and the second transporting path 51, the space efficiency is improved, leading to miniaturization of the apparatus.

OTHER EMBODIMENTS

The image reading device 1 according to the present disclosure basically has the configuration of the embodiments described above, but it is of course possible to change or omit a portion of the configuration without departing from the scope of the present disclosure.

Since the first embodiment and the second embodiment have been described above with reference to FIG. 2, the second transporting path 51 located downstream of the second transporting roller 11 in the transporting direction F is a reversing path or a curved path. However, in the first embodiment and the second embodiment, the second transporting path does not need to be the inversion path, and may be a substantially linear path. The first transporting path 49 may be curved, instead of straight, upstream of the first transporting roller 9.

What is claimed is:

1. An image reading device comprising:
   a motor;
   a reading section that reads an image on a medium;
   a first transporting roller that transports the medium in a transport direction by driving force of the motor and that is provided upstream of the reading section in the transport direction;
   a second transporting roller that transports the medium in the transport direction by driving force of the motor and that is provided downstream of the reading section in the transport direction; and
   a measuring section configured to measure, using an encoder sensor, the rotational position of an encoder scale, wherein
   the encoder scale is provided on a rotation shaft of the second transporting roller,
   the first transporting roller includes
   an upper first transporting roller, and
   a lower first transporting roller that nips the medium with the upper first transporting roller at a first nip position and transports the medium,
   the second transporting roller includes
   an upper second transporting roller, and a lower second transporting roller that nips the medium with the upper second transporting roller at a second nip position transports the medium, the motor transmits driving force to rotation shafts of the upper first transporting roller, the lower first transporting roller, the upper second transporting roller, and the lower second transporting roller, a length of the apparatus in a depth direction at a position where second transporting roller is provided is longer than a length of the apparatus in the depth direction at a position where the first transporting roller is provided, and the encoder scale is provided on a rotation shaft of the lower second transporting roller.

2. The image reading device, according to claim 1, wherein the driving force of the motor is transmitted to the lower first transporting roller and to the upper second transporting roller via the rotation shaft of the lower second transporting roller and is transmitted to the upper first transporting roller via the rotation shaft of the upper second transporting roller and the encoder scale is provided on the rotation shaft of the lower second transporting roller to which the driving force from the motor is transmitted first.

3. The image reading device, according to claim 1, further comprising:

a universal joint provided on the rotation shaft of the upper second transporting roller, wherein the upper second transporting roller and the lower second transporting roller are provided between the universal joint and the encoder scale in a rotation shaft direction.

4. The image reading device, according to claim 1, wherein the second transporting roller includes a drive roller rotated by the motor and a driven roller driven to rotate by the drive roller and the encoder scale is mounted on a rotation shaft of the drive roller.

5. The image reading device, according to claim 1, wherein the second transporting roller includes a drive roller rotated by the motor and a driven roller configured to rotate together with the drive roller and the encoder scale is disposed on a rotation shaft of the driven roller.

6. The image reading device, according to claim 1, further comprising:

a medium detection section provided upstream of the reading section and a control section, wherein the control section measures, using the measuring section, a current distance of after the medium passes through the medium detection section, calculates a differential distance between the current distance and a target distance stored in advance, specifies a position where the difference distance exists in the image data read by the reading section, and performs image correction on the specified position.

7. The image reading device, according to claim 6, wherein the first transporting roller includes an upper first transporting roller and a lower first transporting roller that nips the medium with the upper first transporting roller at a first nip position and transports the medium, the second transporting roller includes an upper second transporting roller and a lower second transporting roller that nips the medium with the upper second transporting roller at a second nip position and transports the medium, and an image correction is executed based on measurement information measured by the measuring section during a period from when a rear end of the medium passes through the first nip position to when the rear end of the medium passes through the second nip position.

8. The image reading device, according to claim 1, further comprising:

a third transporting roller that transports the medium in a transporting direction and that is provided downstream of the second transporting roller in the transporting direction;

a first transporting path through which the medium is transported, the first transporting path including a portion from a nip position of the first transporting roller to a nip position of the second transporting roller, a second transporting path through which the medium is transported, the second transporting path including a portion from the nip position of the second transporting roller to a nip position of the third transporting roller, and a control section that controls transport of the medium, wherein the motor includes a DC motor, the first transporting path includes a straight path, the second transporting path includes a curved path, the control section stops transportation of the medium when a load of the DC motor exceeds a threshold value, and the threshold value when the medium is transported along the second transporting path is larger than the threshold value when the medium is transported along the first transporting path.

9. The image reading device, according to claim 8, further comprising:

a plurality of medium detection sections configured to detect that the medium has passed by each of the first transporting roller and the second transporting roller, wherein the control section executes, based on a combination of detection information from the plurality of the medium detection sections, to increase the threshold as the number of detections increases and to decrease the threshold as the number of detections decreases.

10. The image reading device, according to claim 9, wherein the control section uses a first threshold value in the first curved path of the first curvature and uses a second threshold value larger than the first threshold value in a second curved path having a second curvature larger than the first curvature.

11. The image reading device, according to claim 9, wherein the third transporting roller includes a lower third transporting roller that is driven by the motor and that transports the medium and an upper third transporting roller that is driven to rotate by the lower third transporting roller and that transports the medium while sandwiching the medium with the lower third transporting roller at a third nip position and the threshold value in a case where the medium is transported by the first transporting roller or the second transporting roller is larger than the threshold value in a case where the medium is transported by only the third transporting roller.

12. The image reading device, according to claim 8, wherein
the first transporting path and the second transporting path overlap with a portion of the encoder scale in a side viewing direction.

13. An image correction method of an image reading device, the image reading device including:
a motor,
a reading section configured to read an image on a medium,
a first transporting roller that transports the medium in a transport direction by driving force of the motor and that is provided upstream of the reading section in the transport direction,
a second transporting roller that transports the medium in the transport direction by driving force of the motor and that is provided downstream of the reading section in the transport direction, and
a measuring section configured to measure, using an encoder sensor, the rotational position of an encoder scale, wherein
the encoder scale
is mounted on a rotation shaft of the second transporting roller and
has a medium detection section provided upstream of the reading section,
the image correction method of the image reading device comprising:
measuring, using the measuring section, a current distance of after the medium passes through the medium detection section,
calculating a differential distance between the current distance and a target distance stored in advance;
specifying a position where a difference distance exists in the image data read by the reading section; and
executing an image correction on the specified position.

14. An image reading device comprising:
a motor;
a reading section that reads an image on a medium;
a first transporting roller that transports the medium in a transport direction by driving force of the motor and that is provided upstream of the reading section in the transport direction;
a second transporting roller that transports the medium in the transport direction by driving force of the motor and that is provided downstream of the reading section in the transport direction;
a measuring section configured to measure, using an encoder sensor, the rotational position of an encoder scale;
a medium detection section provided upstream of the reading section; and
a control section, wherein
the control section
measures, using the measuring section, a current distance of after the medium passes through the medium detection section,
calculates a differential distance between the current distance and a target distance stored in advance,
specifies a position where the difference distance exists in the image data read by the reading section, and
performs image correction on the specified position, and
wherein the encoder scale is provided on a rotation shaft of the second transporting roller.

15. The image reading device, according to claim 14, wherein
the second transporting roller includes
a drive roller rotated by the motor and
a driven roller driven to rotate by the drive roller and
the encoder scale is mounted on a rotation shaft of the drive roller.

16. The image reading device, according to claim 14, wherein
the second transporting roller includes
a drive roller rotated by the motor and
a driven roller configured to rotate together with the drive roller and
the encoder scale is disposed on a rotation shaft of the driven roller.

17. The image reading device, according to claim 14, wherein
the first transporting roller includes
an upper first transporting roller and
a lower first transporting roller that nips the medium with the upper first transporting roller at a first nip position and transports the medium,
the second transporting roller includes
an upper second transporting roller and
a lower second transporting roller that nips the medium with the upper second transporting roller at a second nip position and transports the medium, and
an image correction is executed based on measurement information measured by the measuring section during a period from when a rear end of the medium passes through the first nip position to when the rear end of the medium passes through the second nip position.

18. The image reading device, according to claim 14, further comprising:
a third transporting roller that transports the medium in a transporting direction and that is provided downstream of the second transporting roller in the transporting direction;
a first transporting path through which the medium is transported, the first transporting path including a portion from a nip position of the first transporting roller to a nip position of the second transporting roller,
a second transporting path through which the medium is transported, the second transporting path including a portion from the nip position of the second transporting roller to a nip position of the third transporting roller, and
a control section that controls transport of the medium, wherein
the motor includes a DC motor,
the first transporting path includes a straight path,
the second transporting path includes a curved path,
the control section stops transportation of the medium when a load of the DC motor exceeds a threshold value, and
the threshold value when the medium is transported along the second transporting path is larger than the threshold value when the medium is transported along the first transporting path.

19. An image reading device comprising:
a motor;
a reading section that reads an image on a medium;
a first transporting roller that transports the medium in a transport direction by driving force of the motor and that is provided upstream of the reading section in the transport direction;
a second transporting roller that transports the medium in the transport direction by driving force of the motor and that is provided downstream of the reading section in the transport direction;
a measuring section configured to measure, using an encoder sensor, the rotational position of an encoder scale,
a third transporting roller that transports the medium in a transporting direction and that is provided downstream of the second transporting roller in the transporting direction;
a first transporting path through which the medium is transported, the first transporting path including a portion from a nip position of the first transporting roller to a nip position of the second transporting roller,
a second transporting path through which the medium is transported, the second transporting path including a portion from the nip position of the second transporting roller to a nip position of the third transporting roller, and
a control section that controls transport of the medium, wherein
the encoder scale is provided on a rotation shaft of the second transporting roller,
the motor includes a DC motor,
the first transporting path includes a straight path,
the second transporting path includes a curved path,
the control section stops transportation of the medium when a load of the DC motor exceeds a threshold value, and
the threshold value when the medium is transported along the second transporting path is larger than the threshold value when the medium is transported along the first transporting path.

* * * * *